(12) United States Patent
Bryant et al.

(10) Patent No.: US 7,228,542 B2
(45) Date of Patent: Jun. 5, 2007

(54) SYSTEM AND METHOD FOR DYNAMICALLY CREATING A CUSTOMIZED MULTI-PRODUCT SOFTWARE INSTALLATION PLAN AS A TEXTUAL, NON-EXECUTABLE PLAN

(75) Inventors: Daryl Keith Bryant, San Jose, CA (US); Frederick M. Fusilero, San Jose, CA (US); Humberto Gutierrez-Rivas, Rochester, NY (US); Terence Walters, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 607 days.

(21) Appl. No.: 10/324,682

(22) Filed: Dec. 18, 2002

(65) Prior Publication Data

US 2004/0123284 A1 Jun. 24, 2004

(51) Int. Cl.
*G06F 9/445* (2006.01)
(52) U.S. Cl. .................. 717/177; 717/174; 717/175; 717/176
(58) Field of Classification Search ........ 717/102–174, 717/175–176; 709/224
See application file for complete search history.

(56) References Cited

U.S. PATENT DOCUMENTS

| 5,524,246 | A | 6/1996 | Hurley et al. ............... 395/700 |
| 6,370,681 | B1 | 4/2002 | Dellarocas et al. ............ 717/1 |
| 6,910,208 | B1* | 6/2005 | Zimniewicz ................. 717/174 |
| 2003/0110253 | A1* | 6/2003 | Anuszczyk et al. ......... 709/224 |
| 2004/0015819 | A1* | 1/2004 | Romano-Critchley et al. ......................... 717/102 |

* cited by examiner

*Primary Examiner*—Meng-Al T. An
*Assistant Examiner*—Mark P. Francis
(74) *Attorney, Agent, or Firm*—Samuel A. Kassatly (57) ABSTRACT

A computer product generates an installation plan based on the products, components, features, and system configuration of the associated software product that the user selects for installation on the user's system. The installation plan is printable and creates an easy-to-follow installation sequence including information regarding product configuration and software and hardware requirements. In addition, the installation plan lists the product CDs required during the installation process.

27 Claims, 12 Drawing Sheets

SYSTEM AND METHOD FOR DYNAMICALLY CREATING A CUSTOMIZED MULTI-PRODUCT SOFTWARE INSTALLATION PLAN AS A TEXTUAL, NON-EXECUTABLE PLAN

FIELD OF THE INVENTION

The present invention generally relates to the field of computer program products installation. More specifically, the present invention relates to a computer product with an interactive user interface that allows a user to select system configuration, products, components, and features for installation of a large or complex software package, and then to generate a customized installation plan for reference by the user during the installation process.

BACKGROUND OF THE INVENTION

Installation and configuration of large software packages is often a time consuming and tedious task. For large software packages that involve multiple products, components, and features, the system administrator must read multiple manuals and chapters to gather information necessary for installation. This information might include which components must be installed, any required prerequisites, the necessary sequence of installation steps, which CDs inside and outside of the software package are required, configuration steps, etc. Consequently, users or system administrators spend a considerable amount of time collecting planning and installation information for the software package to be installed.

Currently, a "Before You Start" CD has been provided to the installer for use with the Winhelp format. This "Before You Start" CD provides product overview and system configuration information, but does not necessarily include other relevant information. In addition, a customized installation plan is not generally created for the user to follow.

What is therefore needed is a computer program that provides users with a custom installation plan based on a single point of access for product packaging information, planning information, and installation assistance. This plan and associated information should be provided to the user before the user begins installing the product to minimize confusion. The need for such a product has heretofore remained unsatisfied.

SUMMARY OF THE INVENTION

The present invention satisfies this need, and presents a system and associated method (collectively referred to herein as "the system" or "the present system") for automatically creating a multi-program installation plan. Software manufacturers might include the present system with their software products to aid the user in product installation.

It is one object of the present system to provide a logical initial step for installing a computer product with the goal of improving the overall out-of-box experience of the product for the user. This goal is accomplished by consolidating product overview and system configuration information for multiple products in a single HTML interface. The present system generates a quick start form for software installation, providing users or installers with the guidance needed to install and configure the product.

The present system is a self-contained unit of content relating to planning, installation, and configuration of a large software product that introduces users to the product package, informs users of product capabilities, and informs users of potential system configurations. The present system reduces confusion regarding the first step in product installation. It further reduces the time users spend collecting planning and installation information.

In addition, the present system further provides an interactive installation planning assistant that automatically creates a customized installation plan based on system configuration, product, component, and feature requirements that users select for the installation of the software product on their computers.

This printable installation plan creates an easy-to-follow installation sequence and provides the user with information regarding software and hardware requirements. In addition, to further facilitate the installation process, the installation plan lists the product CDs required during the installation process and provides configuration worksheets that users can complete prior to installation.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definition provides background information pertaining to the technical field of the present invention, and is intended to facilitate the understanding of the present invention without limiting its scope:

HTML: HTML (Hypertext Markup Language): A standard language for attaching presentation and linking attributes to informational content within documents. During a document authoring stage, HTML "tags" are embedded within the informational content of the document. When the web document (or "HTML document") is subsequently transmitted by a web server to a web browser, the tags are interpreted by the browser and used to parse and display the document. In addition to specifying how the web browser is to display the document, HTML tags can be used to create hyperlinks to other web documents.

Figure 1:
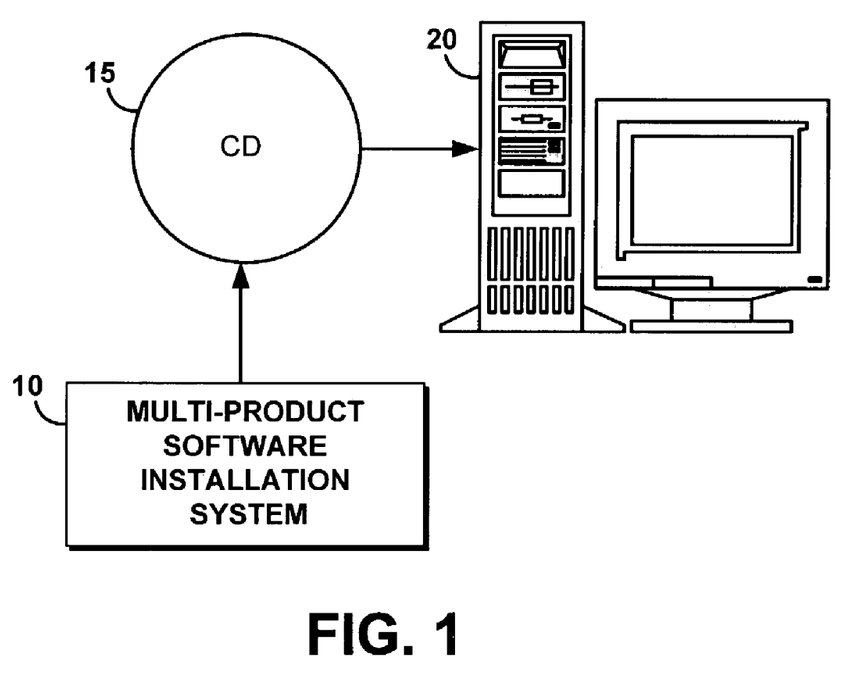
FIG. 1 is a schematic illustration of an exemplary operating environment in which a multi-product software installation system of the present invention can be used.

FIG. 1 portrays an exemplary overall environment in which a system 10 and associated method 200 for automatically creating a customized multi-program installation plan according to the present invention may be used. System 10 includes a software programming code or computer program product that is typically installed on a compact disk ("CD") 15. Alternatively, system 10 can be imbedded within, or installed on a host server or other computer device or saved on a suitable storage medium such as a diskette, a hard drive, or like devices.

The CD 15 is provided by a software manufacturer as part of its software product. System 10 can be viewed and operated by a user or system administrator, illustrated as computer 20, to provide installation support. Computer 20 may be a desktop computer, a server, a set of computers in a distributed configuration, or any computing device in which a software product may be installed.

Figure 2A:
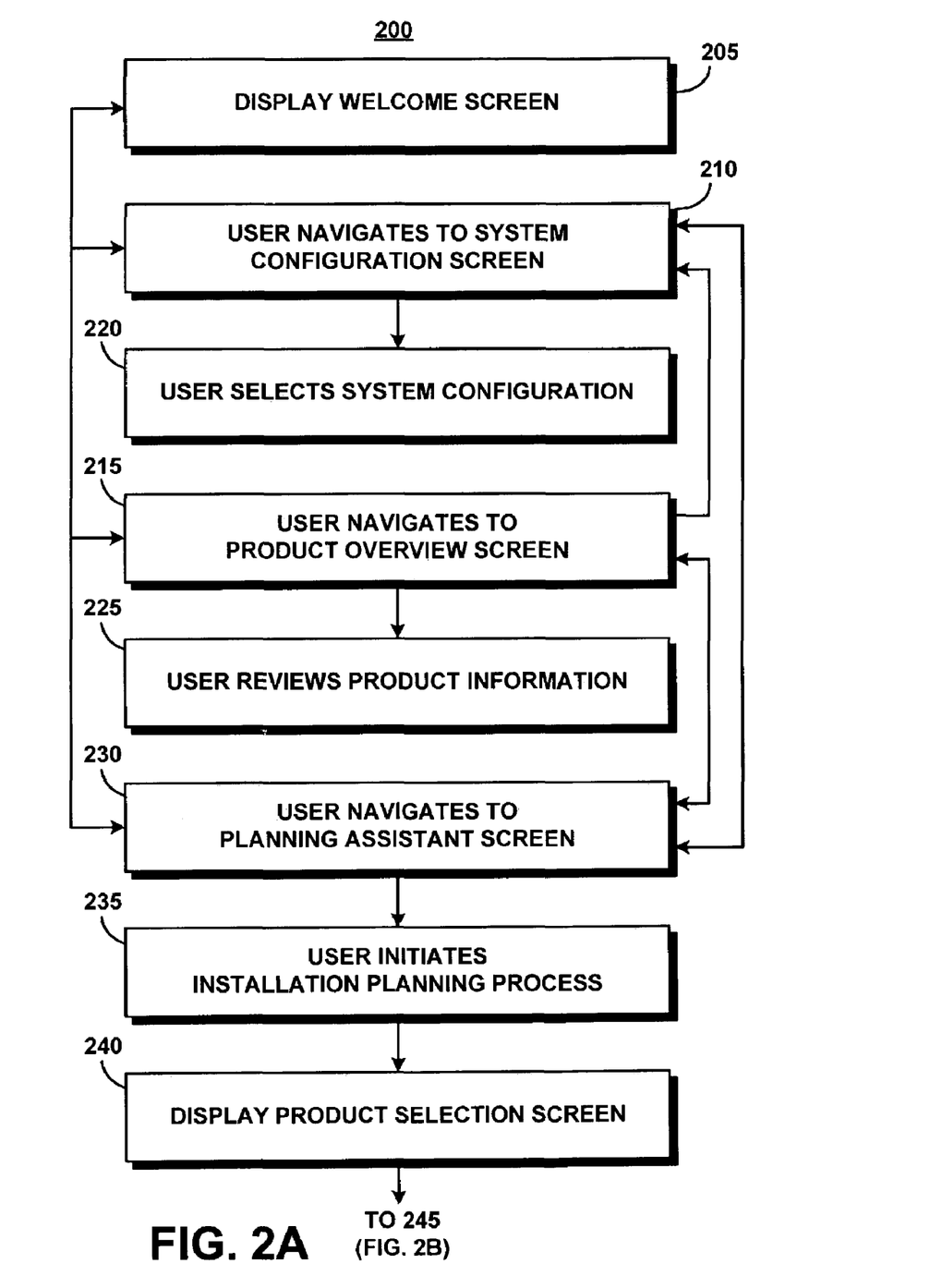
FIG. 2 is comprised of FIGS. 2A and 2B, and represents a process flow chart illustrating a method of operation of the automatic multi-product software installation system of FIG. 1.
Figure 2B:
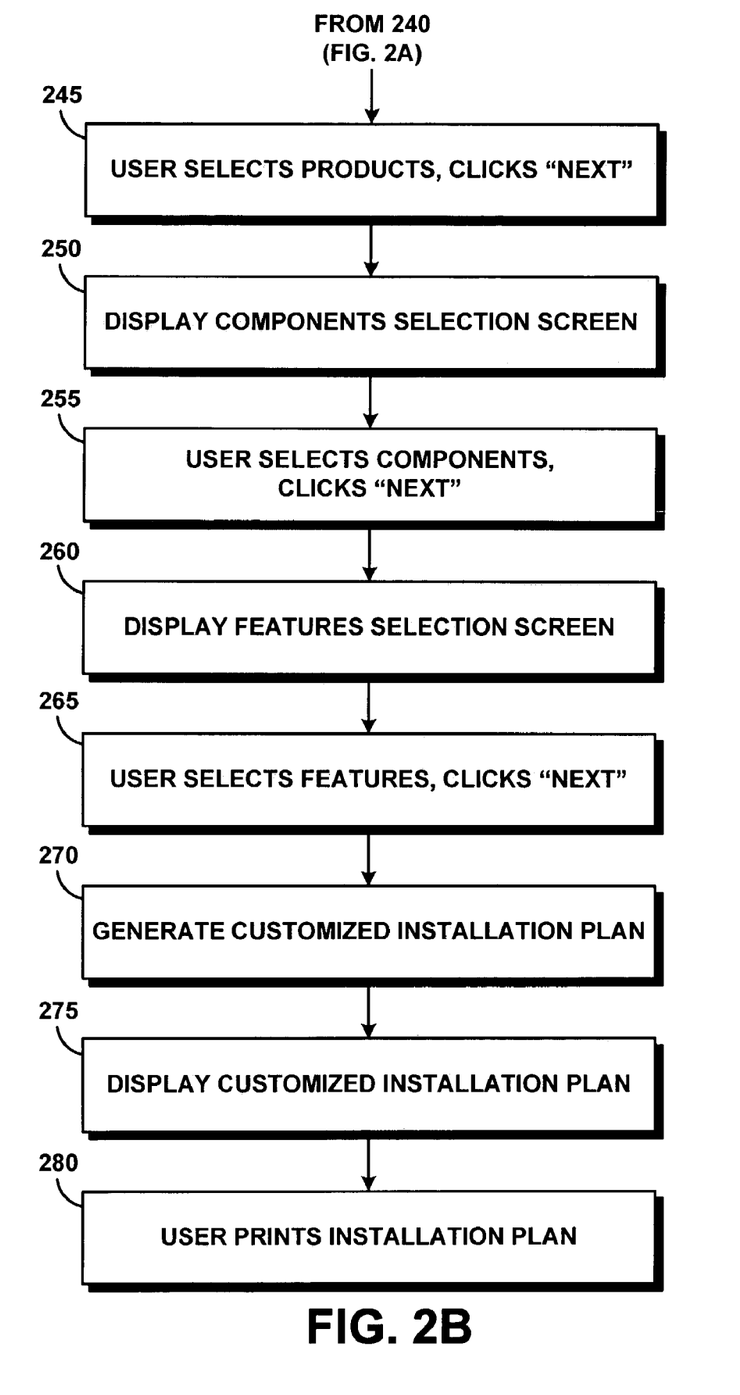

The method 200 for operating system 10 is illustrated in the process flow chart of FIG. 2. For illustration purposes, system 10 is described to use client-side javascript pages to generate an installation plan for the computer product. The installation plan informs the users of the hardware and software requirements, package CDs, and installation and configuration steps required to install the computer product on computer 20.

System 10 presents the user with a series of interactive hyperlinked screens, i.e., with HTML links, to lead the user through the process of gathering information and defining the parameters for the installation. System 10 initially displays a "welcome" screen to the user at block 205. The "welcome" screen introduces the user to the product overview, system diagram, and planning assistant.

From the "welcome" screen, the user may navigate to a system configuration screen at block 210, or to a product overview screen at block 215. The system configuration screen at block 210 provides the user with a pictorial view of how products and components are installed as opposed to a purely textual view. Consequently, the user is able to plan a more effective installation of the computer program. From the system configuration screen at block 210, the user may then select a computer system configuration (block 220) for more detailed information on the benefits of a given setup.

From the product overview page (block 215), the user may review product information and specifications by clicking on a variety of hypertext links. The product overview screen provides key pieces of information to the user such as the different products included in the installation package, information about each of the products, and the components that comprise those products. Information about each of the products and their components is available to the user at a single glance. Without the help of system 10, the user would be required to search through multiple manuals and chapters for this information.

Also available to the user on the product overview screen is the number of CDs pertaining to each specific product, the operating system each specific product supports, any software product requirements or prerequisites for each specific product. The user may then return to the "welcome" screen at block 205, either from the product overview screen (block 215) or from the system configuration screen (block 210). The user may also navigate between the system configuration screen (block 210) and the product overview screen (block 215).

After selecting the system configuration at block 210, and reviewing the product information at block 215, the user navigates to the "planning assistant" screen at block 230. The planning assistant screen contains a "start" link; the user initiates the installation planning process by clicking on that link at block 235. System 10 displays a products selection screen at block 240.

On the product selection screen, system 10 presents a list of the software products available to the user within the planning assistant. For each product listed, the user can select a hyperlink to view a pop up window that provides "snap shot" description of the product including one or more different prerequisite programs that may be required for installation.

At block 245, the user selects the desired products for installation, then clicks a "next" link to display the components selection screen at block 250. For each component at block 255, the user can select a hyperlink to view a pop up window that provides a "snap shot" description of the components or select the desired component for installation. Once completed, the user then clicks a "next" link to display the features selection screen at block 260. The list of features available to the user within the planning assistant Is dynamically generated based on the initial products selected. As used herein, features include product options.

At block 265, the user selects the features to include in the installation plan, then clicks a "next" link. With products (block 245), components (block 255), and features (265) specified by the user, system 10 then generates a customized installation plan at block 270 and displays that plan to the user at block 275. The user then prints the installation plan at block 280 to reference while installing the product.

The customized installation plan includes a configuration worksheet, hardware requirements, and customized instructions for installation. For each selected product and component, system 10 provides a table of information that includes hardware and software requirements, the product CDs needed, installation and configuration steps, and a configuration worksheet.

The customized installation plan shows the user which prerequisites to install, the order of installation for the prerequisites, how to configure each prerequisite program, the order in which to install the products, and how to configure the products to work with the prerequisites. The customized installation plan also provides the user with a list of CDs that will be needed during installation. Consequently, the user will not have to stop or pause the installation while searching for information or CDs.

Figure 3:
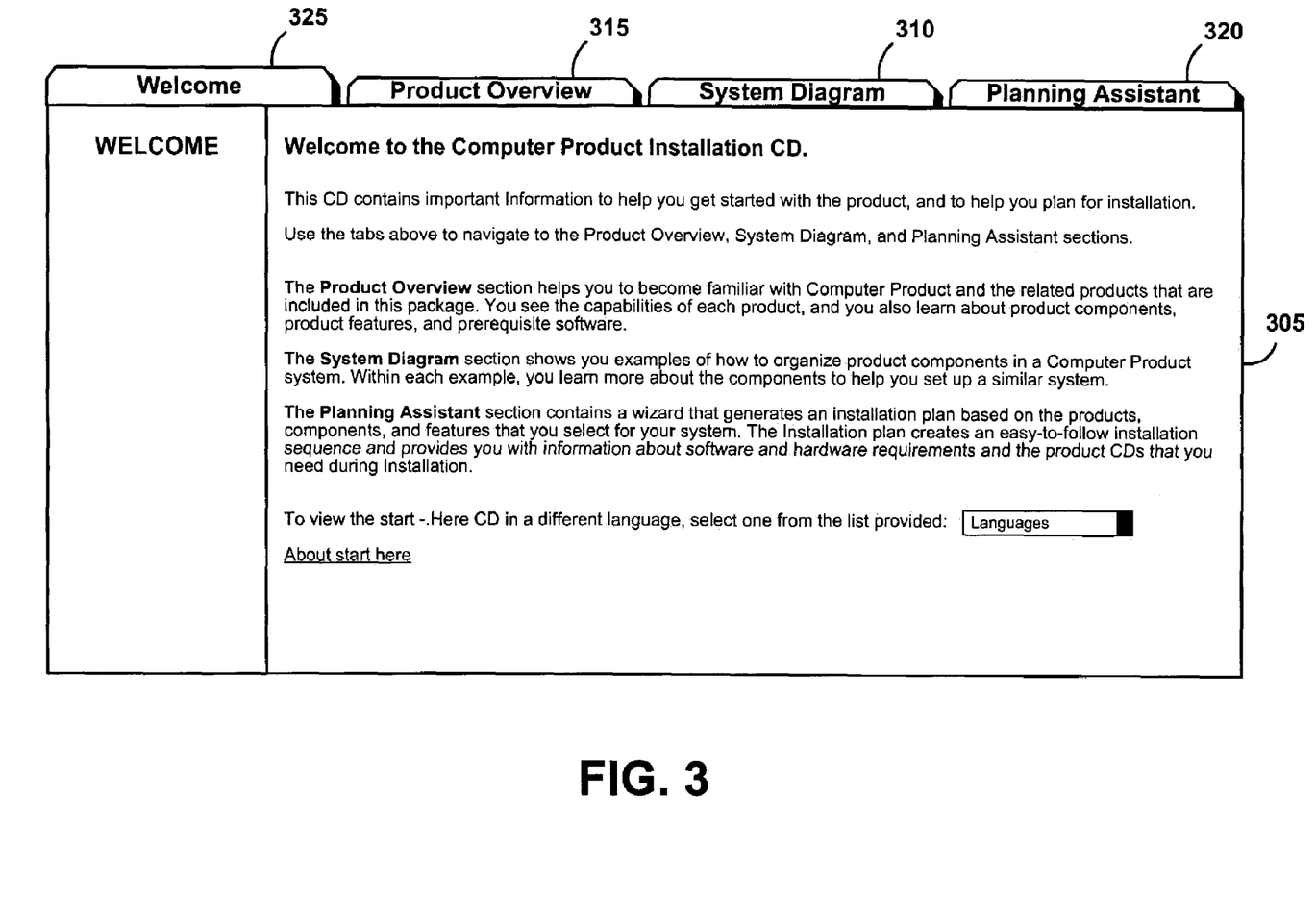
FIG. 3 is a screen shot displaying an exemplary "welcome" screen for the automatic multi-product software installation planning system of FIG. 1.

A sample "welcome" screen is shown in FIG. 3. This screen includes a brief introduction 305 to the installation CD. The user can navigate to the system diagram using navigation link 310, the product overview using navigation link 315, and the planning assistant using navigation link 320.

Figure 4:
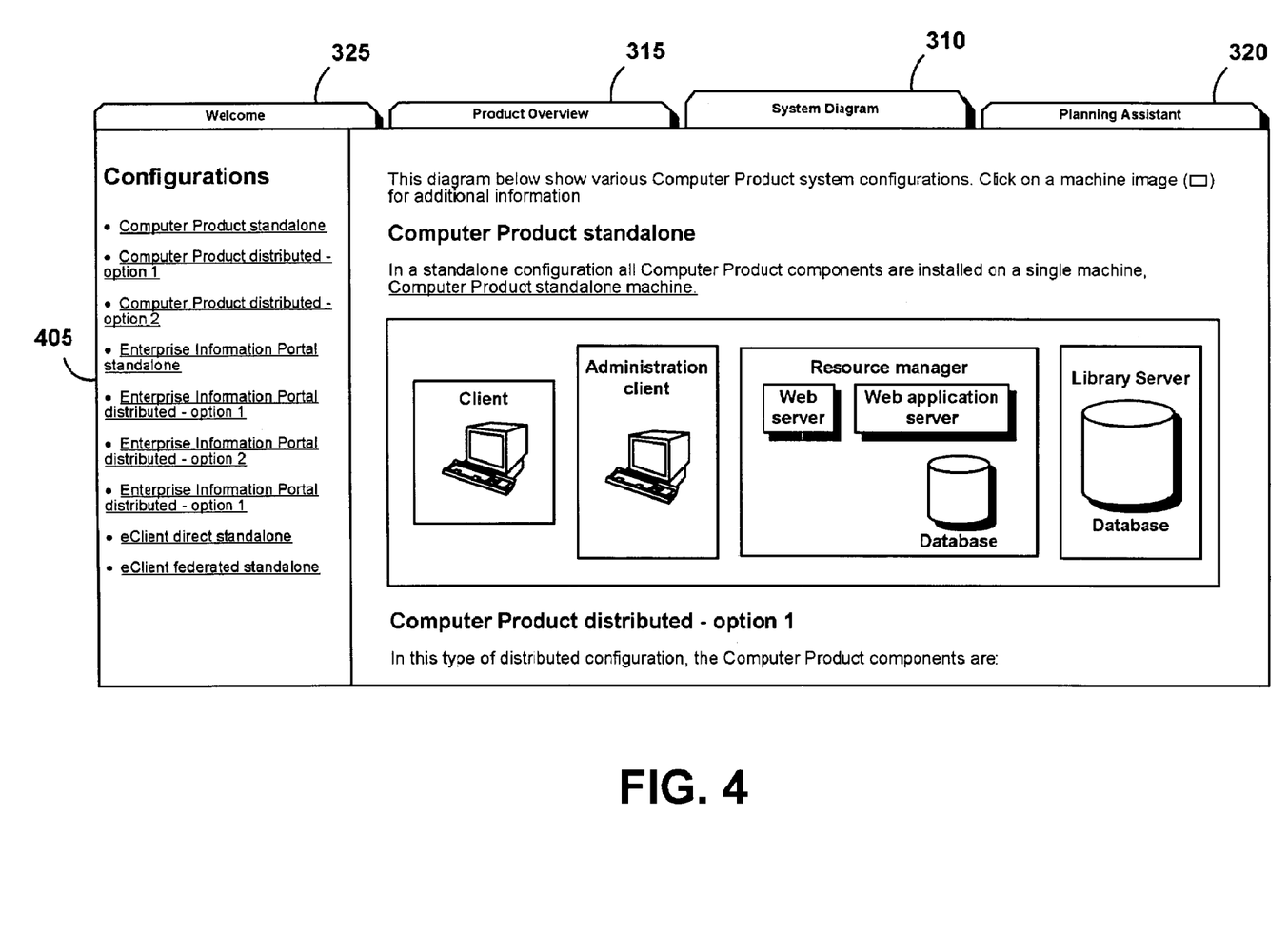
FIG. 4 is a screen shot displaying an exemplary system configuration screen for the automatic multi-product software installation system of FIG. 1.

An exemplary system diagram screen is shown in FIG. 4. Links to descriptions of possible configurations are listed in a configurations list 405. The user may navigate to the product overview using navigation link 315, the planning assistant using navigation link 320, and the "welcome" screen using navigation link 325.

Figure 5:
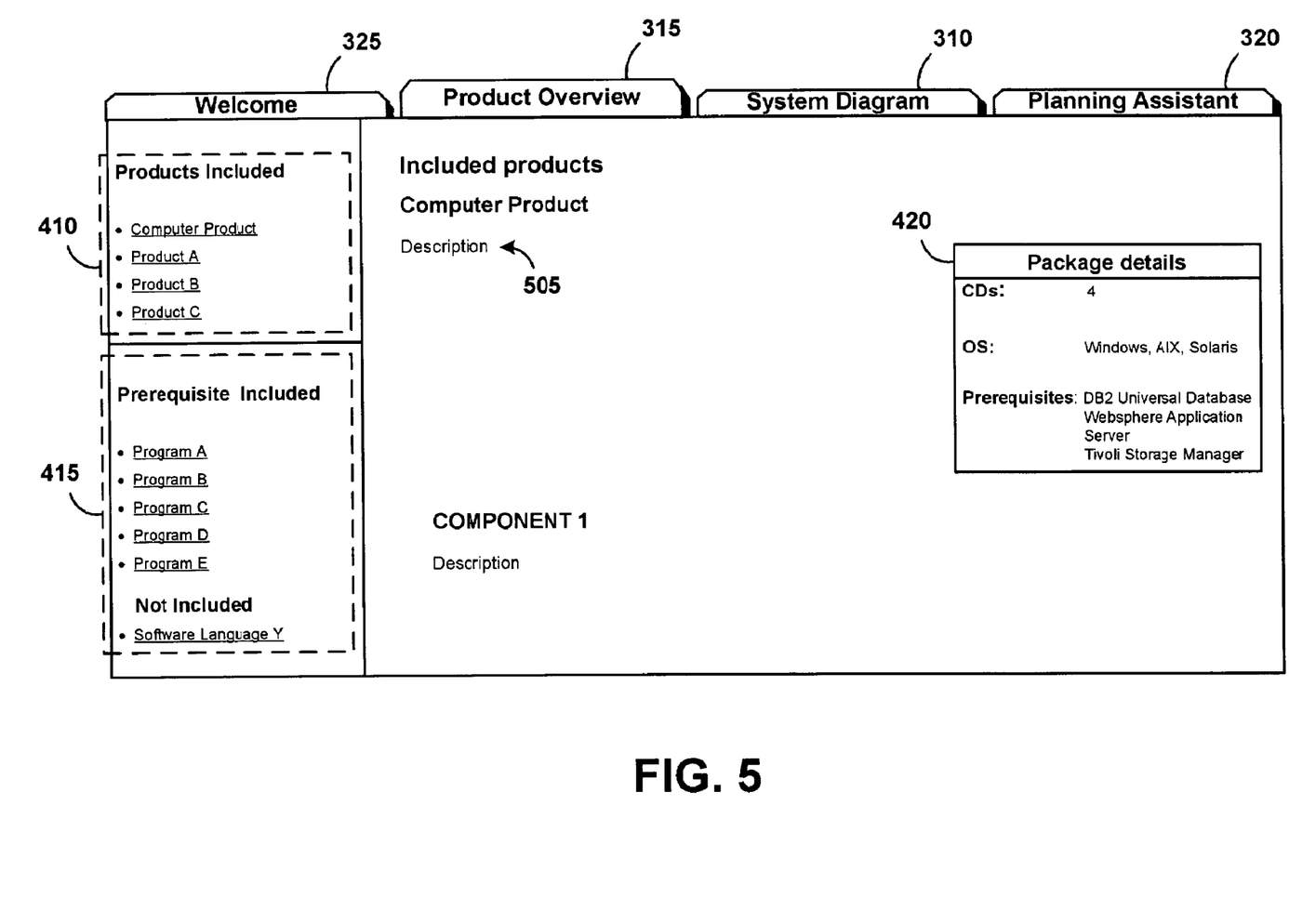
FIG. 5 is a screen shot displaying an exemplary product overview screen for the automatic multi-product software installation system of FIG. 1.

A screen shot of a sample product overview screen is shown in FIG. 5. A description 505 of products included in the software package is listed in the screen body. Links to detailed descriptions of products included in the software package are included in block 410 and links to detailed descriptions of prerequisites for installation are listed in block 415. Additional package details are available through links in block 420. The user may navigate to the system diagram screen using navigation link 310, the planning assistant using navigation link 320, and the "welcome" screen using navigation link 325.

Figure 6:
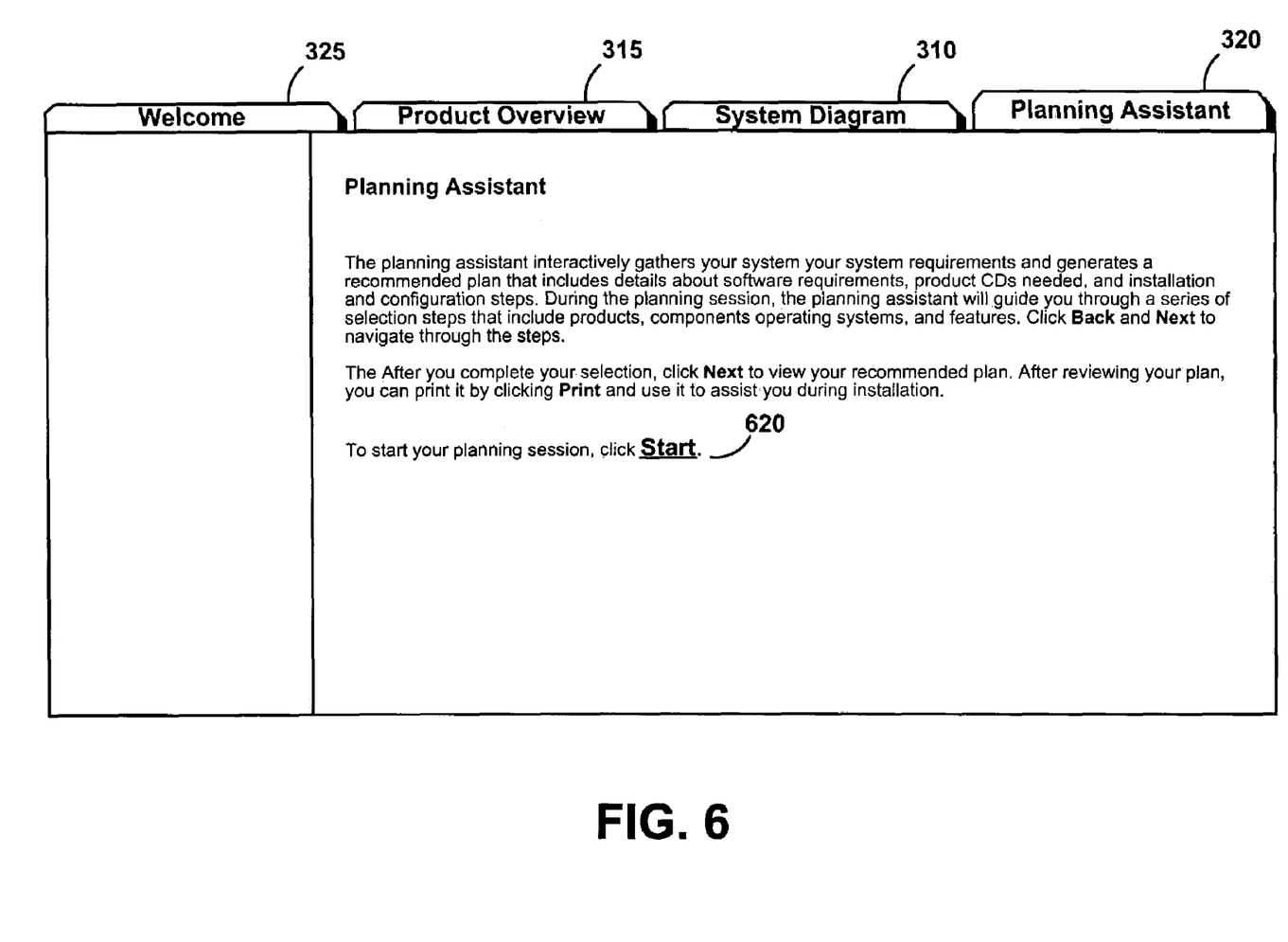
FIG. 6 is a screen shot displaying an exemplary planning assistant screen for the automatic multi-product software installation system of FIG. 1.

A sample planning assistant screen is shown in FIG. 6. The user may navigate to the system diagram screen using navigation link 310, the product overview screen using navigation link 315, and the "welcome" screen using navigation link 325. To initiate the installation planning process, the user clicks on the start link 620 (block 235 of FIG. 2).

Figure 7:
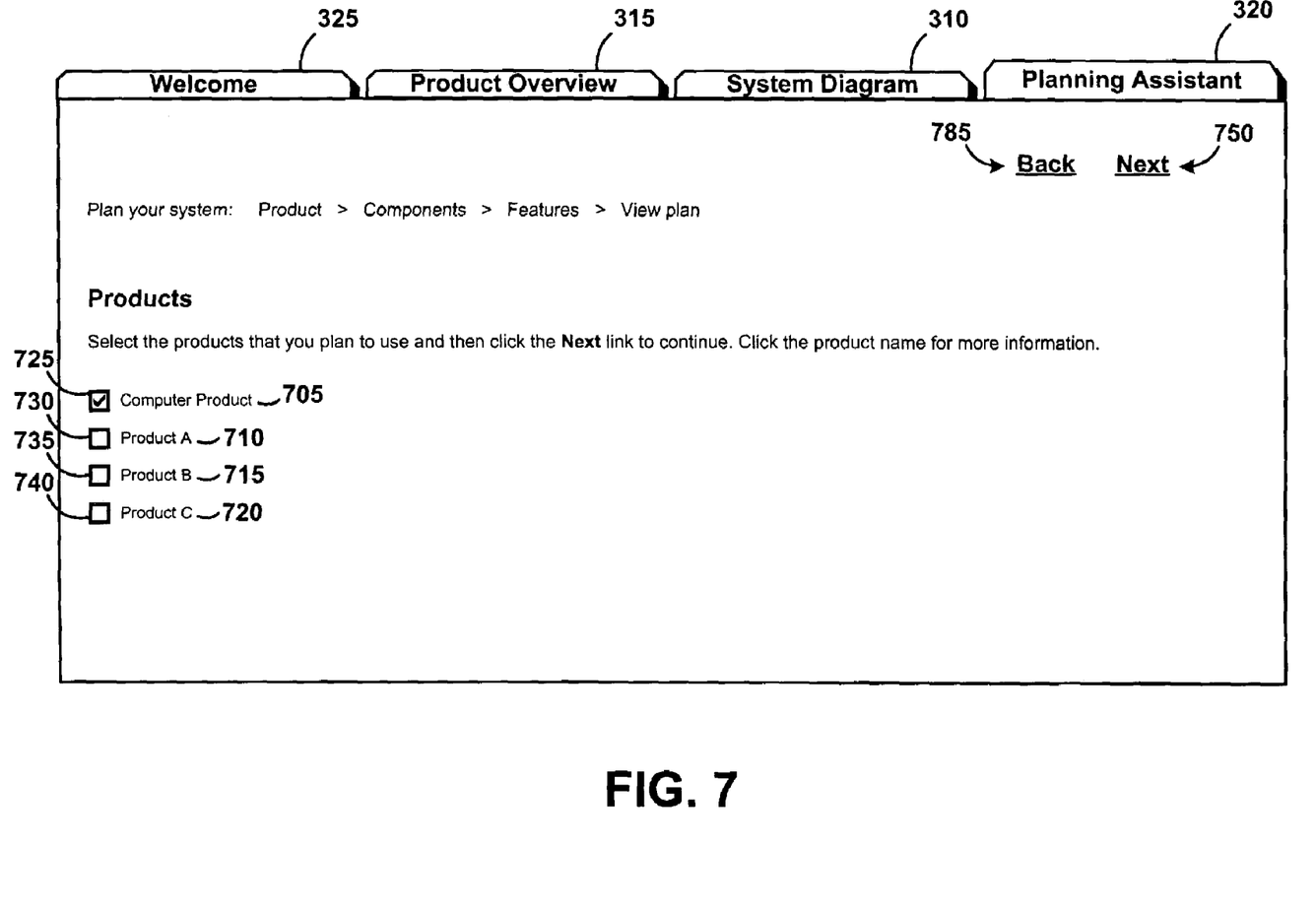
FIG. 7 is a screen shot displaying an exemplary product selection screen for the automatic multi-product software installation system of FIG. 1.

System 10 then displays a product selection screen such as the sample product selection screen shown in FIG. 7. Products such as computer product 705, product A 710, product B 715, and product C 720 are listed. The user may select a product by clicking on the box next to the product name (block 250 of FIG. 2). To select computer product 705, the user clicks on box 735 and system 10 places a check mark in the box signifying its selection. The user chooses not to select any other products; consequently, boxes 730, 735, and 740 contain no check marks.

The user may return to the previous screen by clicking on "back" navigation link 785 or continue to the next screen by clicking on "next" navigation link 750. As before, the user may navigate to the system diagram screen using navigation link 310, the planning assistant using navigation link 320, and the "welcome" screen using navigation link 325.

Figure 8:
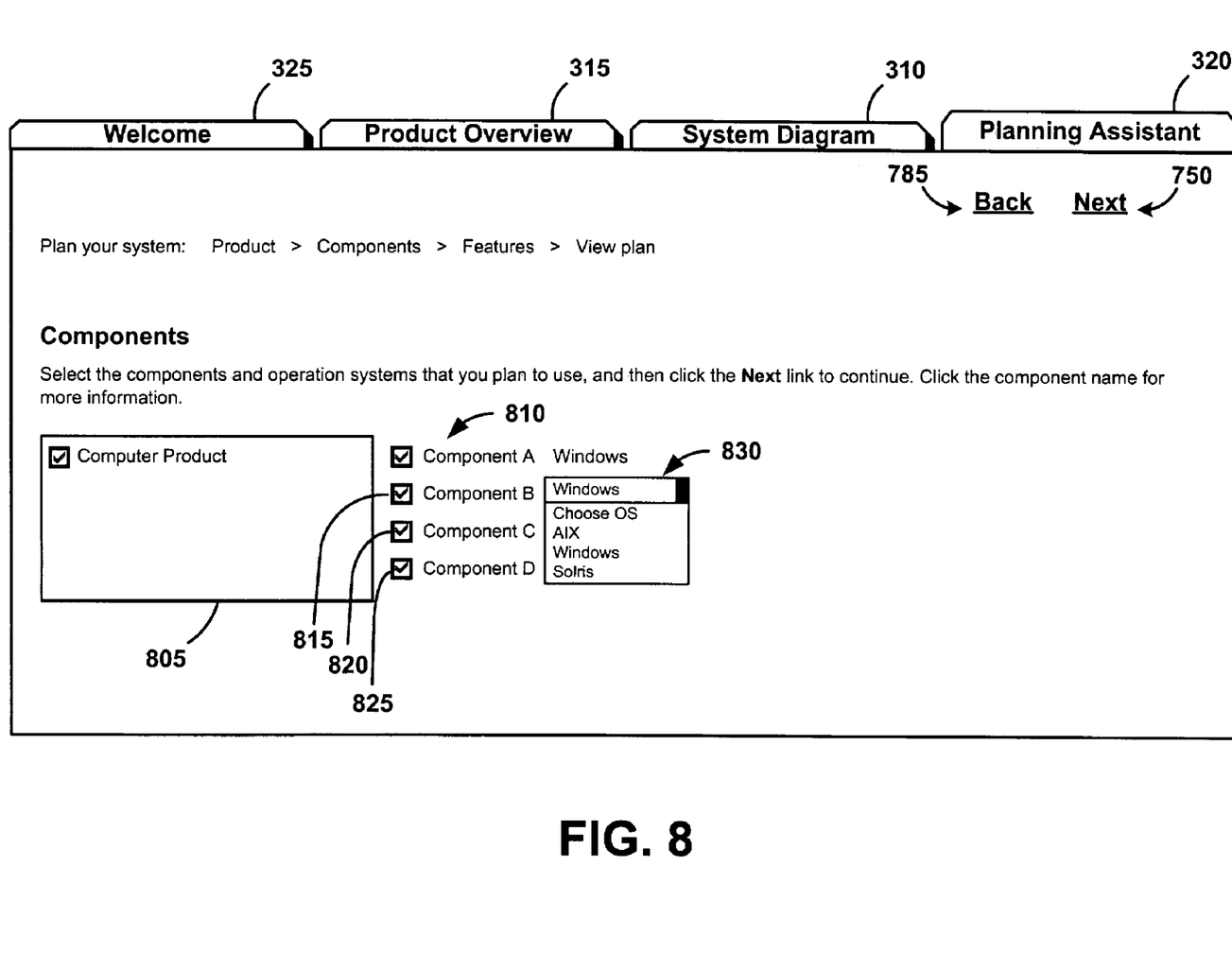
FIG. 8 is a screen shot displaying an exemplary components selection screen for the automatic multi-product software installation system of FIG. 1.

The user proceeds to the components selection screen by clicking on the "next" navigation link 750. A sample components selection screen is shown in FIG. 8. The product or products selected by the user at block 250 of FIG. 2, are listed by system 10 in box 805. In this example, the user chooses to install "computer product".

System 10 lists all possible components for installation for this product: component A 810, component B 815, component C 820, and component D 825. The user selects the component by clicking on the box next to the component name (block 255 of FIG. 2). In this example, the user selects all four components listed, as indicated by the check mark in the check boxes for component A 810, component B 815, component C 820, and component D 825.

The user may also select the operating system for each component by choosing from a list presented by system 10 in pull-down menu 830. Having completed component selection, the user may return to the previous screen by clicking on "back" navigation link 785 or continue to the next screen by clicking on "next" navigation link 750. As before, the user may navigate to the system diagram screen using navigation link 310, the planning assistant using navigation link 320, and the "welcome" screen using navigation link 325.

The user proceeds to the feature selection screen by clicking on the "next" navigation button 750. The system then displays a feature selections screen such as the sample feature selection screen shown in FIG. 9. The products and components selected by the user are listed in box 905.

Figure 9:
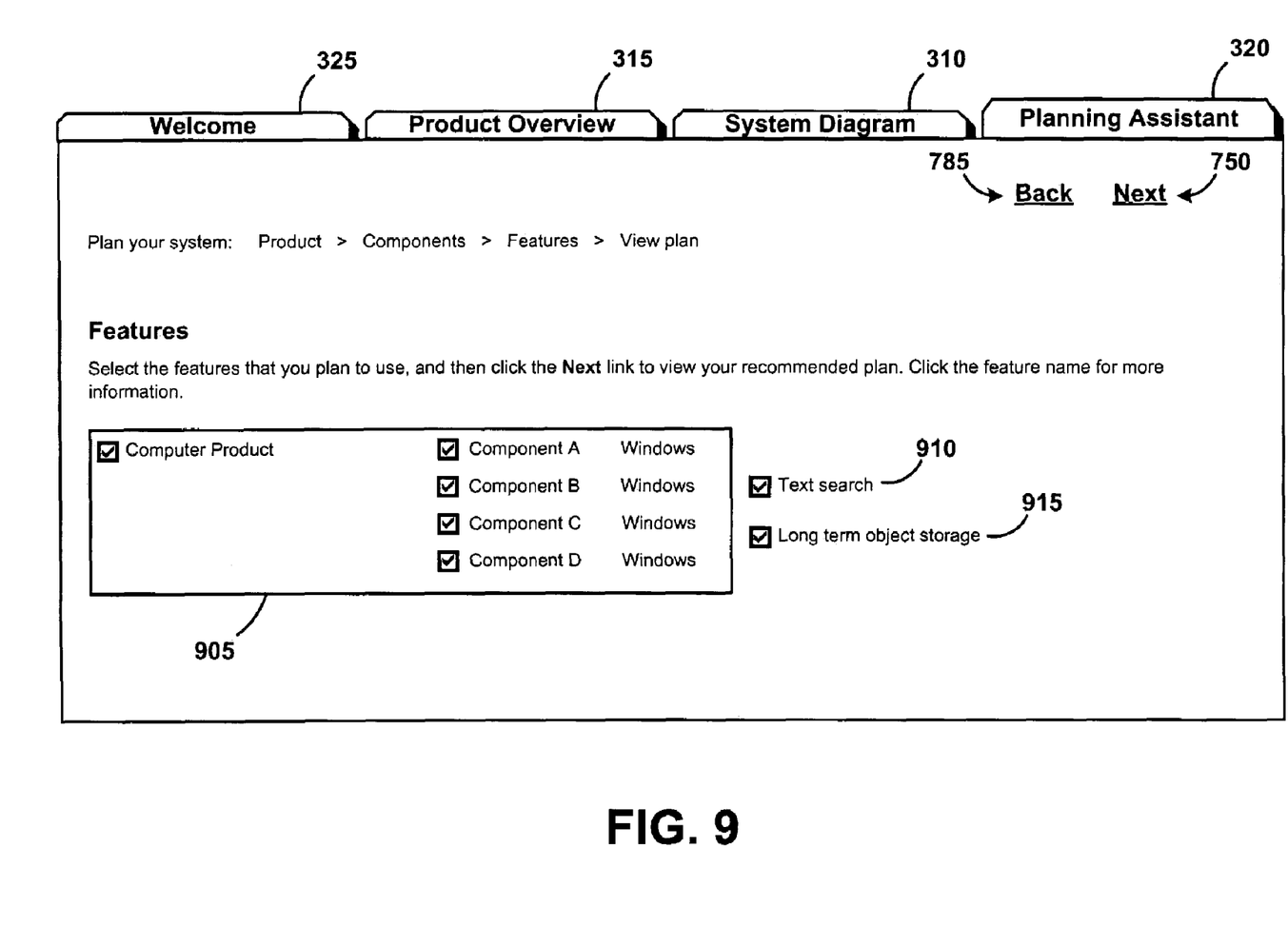
FIG. 9 is a screen shot displaying an exemplary features selection screen for the automatic multi-product software installation system of FIG. 1.

The features for these components are listed to the right of the component, such as "text search" 910 or "long term object storage" 915. As before, the user selects these features by clicking on the check box to the left of the feature name (block 265 of FIG. 2). In this example, both "text search" 910 and "long term object storage" 915 have been selected as indicated by the check mark in the check box.

Having completed the feature selection, the user may return to the previous screen by clicking on the "back" navigation link 785, or continue to the next screen by clicking on "next" navigation link 750. As before, the user may navigate to the system diagram screen using navigation link 310, the planning assistant using navigation link 320, and the "welcome" screen using navigation link 325.

Figure 10:
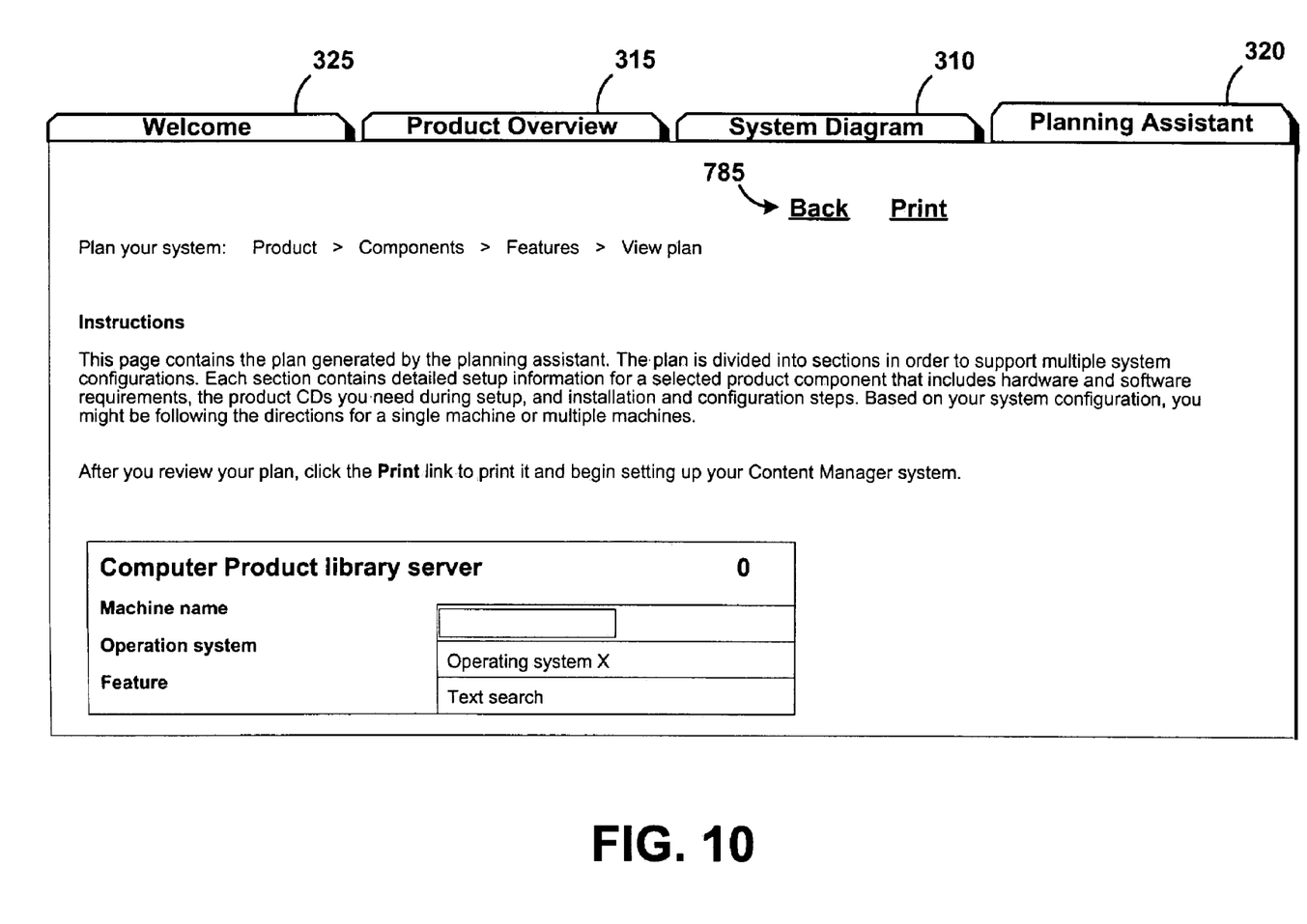
FIGS. 10 and 11 are screen shots displaying an exemplary installation plan screen for the automatic multi-product software installation system of FIG. 1.
Figure 11:
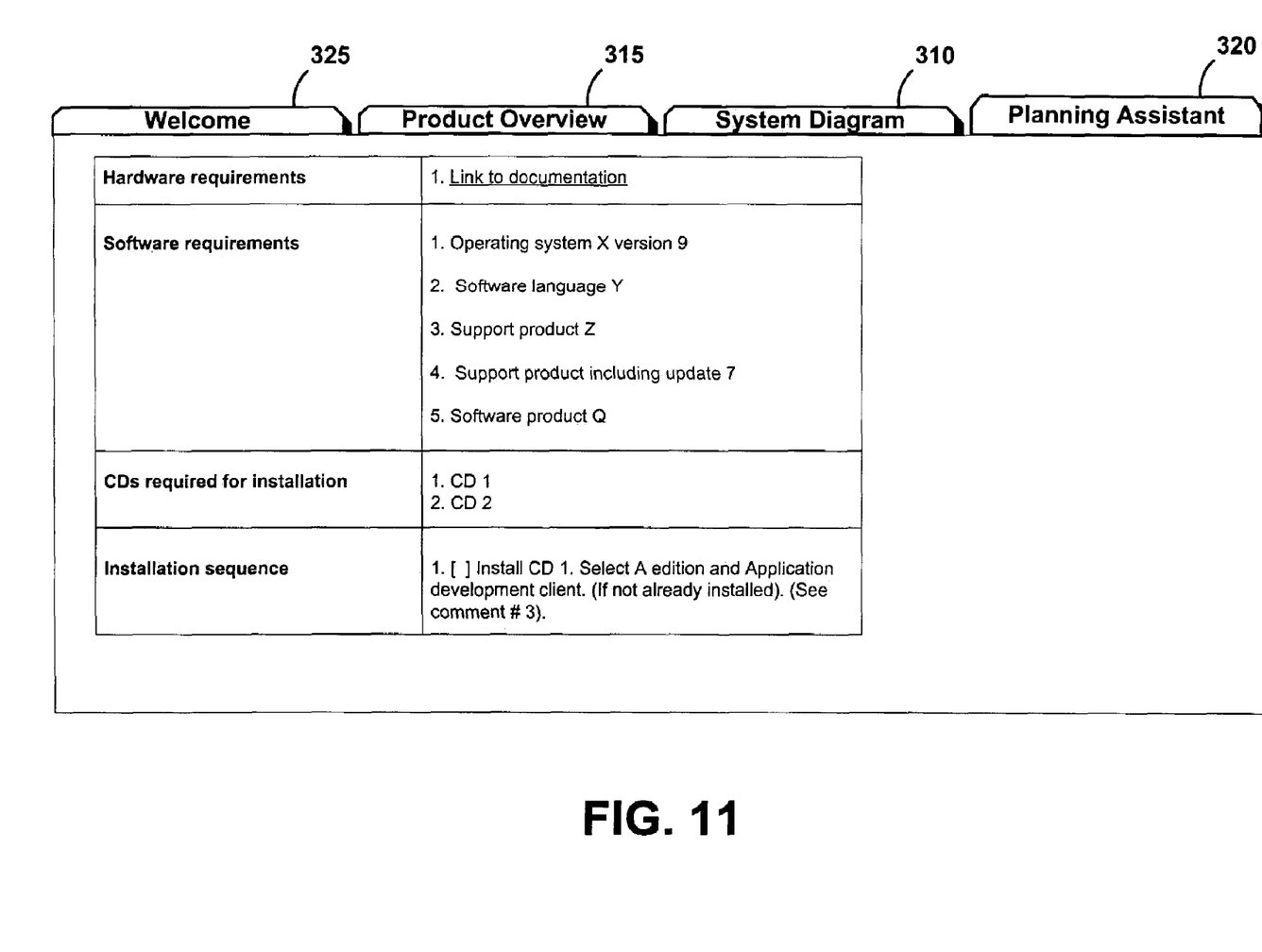

The products, components, and features for installation have now been selected. The user clicks on the "next" navigation link 750 to proceed to the installation instruction screen, such as the sample installation instruction screens shown in FIGS. 10 and 11. When the user clicks on the "next" navigation link 750, system 10 generates a customized installation plan from the products, components, features, and system configuration selected by the user in previous screens (block 270 of FIG. 2). The user may print out this customized installation plan for reference while installing the computer product (block 275 of FIG. 2).

It is to be understood that the specific embodiments of the invention that have been described are merely illustrative of certain application of the principle of the present invention. Numerous modifications may be made to the method for automatically creating a customized multi-program installation plan invention described herein without departing from the spirit and scope of the present invention.

What is claimed is:

1. A processor-implemented method for dynamically creating a customized multi-product software installation plan in order to facilitate a concurrent installation of a plurality of software applications on a computer, the method comprising:

displaying textual descriptions of the software applications;

interactively and graphically selecting at least some of the textual descriptions of the software applications to be installed;

wherein the selected textual descriptions of the software applications to be installed provide different textual installation plans;

displaying textual descriptions of the components of the selected software applications;

interactively and graphically selecting at least some of the displayed textual descriptions of the components of the software applications;

displaying textual descriptions of features of the selected components;

interactively and graphically selecting at least some of the displayed textual descriptions of the features of the selected components;

collecting user information in terms of a user's installation preferences for the selected textual descriptions of the software applications, components, and features;

automatically creating the customized installation plan as a textual, non-executable plan, based on the collected user's installation preferences using dynamic links; and wherein the customized installation plan is customizable to the user's preferences, and provides textual, non-executable installation instructions of the selected software applications, to enable a selective, manual installation of the selected software applications using the customized textual installation plan as a single point access that simulates the installation plan of a single software application.

2. The method of claim 1, wherein the customized installation plan comprises a plurality of installation steps.

3. The method of claim 2, further comprising interactively displaying the steps of the customized installation plan.

4. The method of claim 1, further comprising printing the customized installation plan.

5. The method of claim 1, further comprising navigating to a system configuration screen.

6. The method of claim 5, further comprising navigating to a product overview screen.

7. The method of claim 6, further comprising navigating to a planning assistant screen.

8. The method of claim 7, further comprising navigating to a welcome screen.

9. The method of claim 1, wherein the customized installation plan further comprises any one or more of installation steps, configuration hints, and tips.

10. A computer program product having instruction codes that are stored on a computer with readable storage medium, for dynamically creating a customized multi-product software installation plan in order to facilitate a concurrent installation of a plurality of software applications on a computer, the computer program product comprising:

a program code for displaying textual descriptions of the software applications;

a program code for entering interactively and graphically selected textual descriptions of the software applications to be installed;

wherein the selected textual descriptions of the software applications to be installed provide different textual installation plans;

a program code for displaying textual descriptions of the components of the selected software applications;

a program code for entering interactively and graphically selected textual descriptions of the components of the software applications;

a program code for displaying textual descriptions of features of the selected components;

a program code for entering interactively and graphically selected textual descriptions of the features of the selected components;

a set of instruction codes for collecting user information in terms of a user's installation preferences for the selected textual descriptions of the software applications, components, and features;

a set of instruction codes for automatically creating the customized installation plan as a textual, non-executable plan, based on the collected user's installation preferences using dynamic links; and wherein the customized installation plan is customizable to the user's preferences, and provides textual, non-executable installation instructions of the selected software applications, to enable a selective, manual installation of the selected textual descriptions of the software applications using the customized installation plan as a single point access that simulates the installation plan of a single software application.

11. The computer program product of claim 10, wherein the customized installation plan comprises a plurality of installation steps.

12. The computer program product of claim 11, further comprising a set of instruction codes for interactively displaying the steps of the customized installation plan.

13. The computer program product of claim 10, further comprising a set of instruction codes for printing the customized installation plan.

14. The computer program product of claim 10, further comprising a set of instruction codes for navigating to a system configuration screen.

15. The computer program product of claim 14, wherein the set of instruction codes for navigating to a system configuration screen permits a user to navigate to a product overview screen.

16. The computer program product of claim 15, wherein the set of instruction codes for navigating to a system configuration screen permits a user to navigate to a planning assistant screen.

17. The computer program product of claim 16, wherein the set of instruction codes for navigating to a system configuration screen permits a user to navigate to a welcome screen.

18. The computer program product of claim 10, wherein the customized installation plan further comprises any one or more of installation steps, configuration hints, and tips.

19. A processor-implemented system for dynamically creating a customized multi-product software installation plan in order to facilitate a concurrent installation of a plurality of software applications on a computer, the system comprising:

means for displaying the textual descriptions of software applications;

means for entering interactively and graphically selected textual descriptions of the software applications to be installed;

wherein the selected textual descriptions of the software applications to be installed provide different textual installation plans;

means for displaying textual descriptions of the components of the selected software applications;

means for entering interactively and graphically selected textual descriptions of the components of the software applications;

means for displaying textual description of features of the selected components;

means for entering interactively and graphically selected textual description of the features of the selected components;

means for collecting user information in terms of a user's installation preferences for the selected textual descriptions of the software applications, components, and features;

means for automatically creating the customized installation plan as a textual, non-executable plan, based on the collected user's installation preferences using dynamic links; and wherein the customized installation plan is customizable to the user's preferences, and provides textual, non-executable installation instructions of the selected software applications, to enable a selective, manual installation of the selected textual descriptions of the software applications using the customized installation plan as a single point access that simulates the installation plan of a single software application.

20. The system of claim 19, wherein the customized installation plan comprises a plurality of installation steps.

21. The system of claim 20, further comprising means for interactively displaying the steps of the customized installation plan.

22. The system of claim 19, further comprising means for printing the customized installation plan.

23. The system of claim 19, further comprising means for navigating to a system configuration screen.

24. The system of claim 23, wherein the means for navigating permits a user to navigate to a product overview screen.

25. The system of claim 24, wherein the means for navigating permits a user to navigate to a planning assistant screen.

26. The system of claim 25, wherein the means for navigating permits a user to navigate to a welcome screen.

27. The system of claim 19, wherein the customized installation plan further comprises any one or more of installation steps, configuration hints, and tips.

* * * * *